MAGNETIC FIELD DETECTING DEVICE

Filed Dec. 26, 1962 3 Sheets-Sheet 1

Inventor
Shin-ichi Kawada by Hill, Sherman, Meroni, Gross & Simpson Attys.

MAGNETIC FIELD DETECTING DEVICE

Filed Dec. 26, 1962 3 Sheets-Sheet 2

Inventor
Shin-ichi Kawadi by Hill, Sherman, Meroni, Gross & Simpson Attys.

MAGNETIC FIELD DETECTING DEVICE

Filed Dec. 26, 1962 3 Sheets-Sheet 3

INVENTOR.
Shin-ichi Kawada

BY Hill, Sherman, Meroni, Gross and Simpson ATTORNEYS

United States Patent Office 3,260,930

Patented July 12, 1966

3,260,930

MAGNETIC FIELD DETECTING DEVICE

Shin-ichi Kawada, Meguro-ku, Tokyo, Japan, assignor to Kabushiki-Kaisha Tokyo Keiki Seizosho (Tokyo Keiki Seizosho Co., Ltd.), Tokyo, Japan, a corporation of Japan Filed Dec. 26, 1962, Ser. No. 247,063
Claims priority, application Japan, Dec. 29, 1961, 36/47,929
12 Claims. (Cl. 324—43)

This invention relates to a magnetic field detecting device, and more particularly relates to a device for detecting a magnetic field as a form of an electrical signal.

One object of this invention is to provide a mangetic field detecting device which is simple in construction and accurate in operation.

Another object of this invention is to provide a magnetic field detecting device having a converter circuit of comparatively low impedance, thereby obtaining a greater output current.

A further object of this invention is to provide a magnetic field detecting device in which a converter circuit as one part of the detecting device enables to pass effectively signal pulses produced by a toroidal coil device as the other part of the detecting device without accompanying an appreciable attenuation and losses of the pulses, whereby a higher efficiency of the detecting device can be obtained.

A still further object of this invention is to provide a magnetic field detecting device in which an exciting power for a torodial coil can be used economically.

Other objects, features and advantages of this invention will become apparent from the following description taken in conjunction with the accompanying drawings in which, FIG. 1 is an explanatory diagram of a well-known toroidal coil for detecting a magnetic field;

Figure 1:
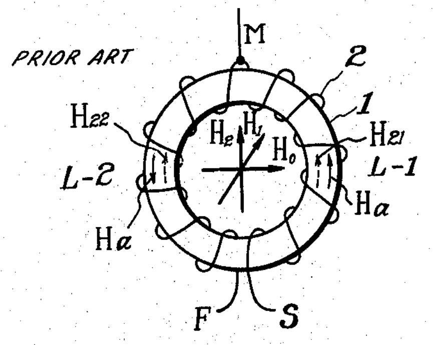
Figure 2:
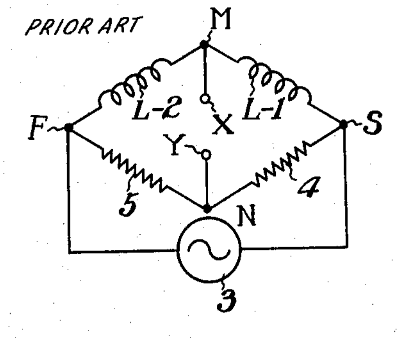
FIGURE 2 is a bridge circuit diagram including the toroidal coil shown in FIGURE 1.

Referring to the drawings, FIGURES 1 and 2 are for explaining a well-known magnetic field detecting device and their explanations will be made for the sake of clarifying the advantages of this invention.

Figure 3:
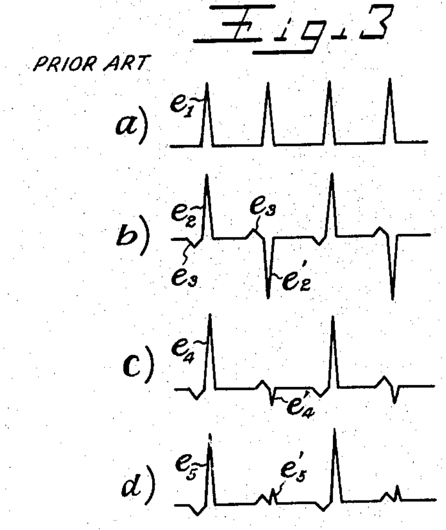
FIGURE 3 is an explanatory diagram illustrating the waveform of a voltage detected by said torodial coil shown in FIGURE 1.
Figure 3A:
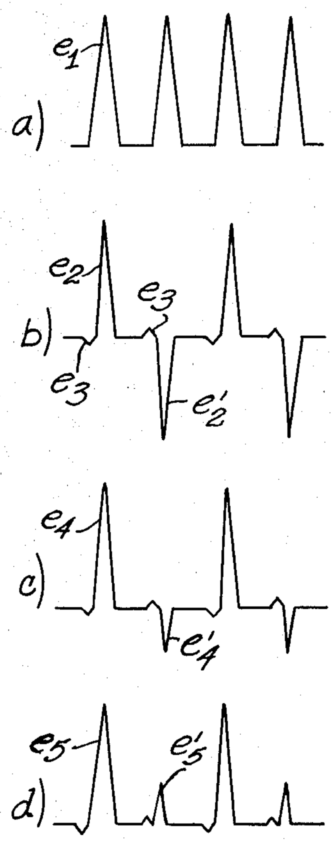
FIGURE 3A is a view similar to FIGURE 3 showing the improved pulse waveform of this invention.

In FIGURE 1, 1 is a high permeability alloy, for example, a ring core made of permalloy or the like, which is usually a single unit made of a punched thin metallic plate or of a punched laminated metallic plate on which a winding 2 is wound as a torodial coil. In this case, one half of the whole number of turns of the winding is mounted on the right half portion of the ring and the other half thereof on the left half portion of the ring and the respective half coils are respectively designated by L–1 and L–2. The middle point of the winding is designated by M, from which a tap T is led out. S shows the beginning of the winding and F the end thereof, and the polarity of the coils L–1 and L–2 is such that when a current flows from S to F the magnetic field produced in the ring core circulates through the whole ring. The toroidal coils are so connected as to form a bridge circuit with an alternating power source 3 and resistors 4 and 5 as shown in FIGURE 2. In FIGURE 2 the saturation magnetic flux and the winding resistance of the coils L–1 and L–2 are respectively equal, and hence in the absence of a magnetic field, if the resistance values of the resistors 4 and 5 are equal, the bridge is in equilibrium and no voltage is produced at detecting ends X and Y independently of whether the core of the toroidal coil is saturated or not. In this case, the voltage of the power source 3 is such that the core is fully saturated within the half cycle of the voltage. If now the external magnetic field exists such as shown by $H_2$, this magnetic field is established in the core in two such as $H_{21}$ and $H_{22}$. On the other hand, the magnetic field produced by an alternating current circulates through the core, so that this magnetic field is produced such as $H_a$ in some half cycle. Since $H_a$ and $H_{21}$ are in the same direction in the coil L–1, the magnetic fields are added while it is deducted in the coil L–2. Accordingly, in this half cycle the core portion on which the coil L–1 is mounted reaches the saturation earlier than that of the coil L–2 and accordingly the coil L–1 rapidly losses its inductance, and hence the equilibrium of the bridge is lost to produce a voltage across X and Y. However, since the core portion corresponding to the coil L–2 is saturated a little after that of the coil L–1, the bridge restores the equilibrium upon the saturation of the coil portion of the coil L–2 and the voltage across X and Y disappears. In the opposite half cycle, $H_a$ is produced in the opposite direction but $H_{21}$ and $H_{22}$ are also in the same direction, so that the core portion of the coil L–2 is saturated earlier than that of the coil L–1 and a voltage is produced across X and Y until the core portion of the coil L–1 is saturated. As a result of this, a pulse voltage $e_1$ such as shown in FIGURE 3A can be obtained across X and Y. The width of this pulse corresponds to the time interval between the saturating times due to the coils L–1 and L–2. According to experiments, the height of the pulse is proportional to this time interval in most cases. The reason why the pulses are produced all in the same direction is that if the core portion of the coil L–1 is saturated earlier than that of the coil L–2 when a plus voltage is added from the alternating power source 3 to the end S of the coil L–1 in FIGURE 2, a pulse to make X plus is produced and in the opposite half cycle the end F of the coil L–2 is plus and further the core portion of the coil L–2 is saturated earlier than that of the coil L–1, and hence a pulse to make X plus is produced again.

Figure 2A:
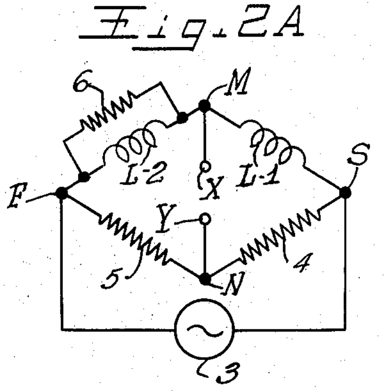
FIGURE 2A is a view similar to FIGURE 2 showing an additional impedance connected in parallel with one of the windings.

In order to detect accurately the magnetic field $H_2$ when the pulse is extremely small such for example as in the vicinity of zero of $H_2$, the resistor 6 is usually connected to the circuit of FIGURE 2 as shown in FIGURE 2A. With the connection of such resistor, the alternating voltage to be added to the coil L–2 can be always smaller than that to the coil L–1. In this condition, the resistors 4 and 5 are so selected as to balance the bridge after the saturation of the two core portions and if there is no external magnetic field, such pulses $e_2$ and $e_2'$ as shown in FIGURE 3*b* can be obtained across X and Y. This is because the applied voltage across the terminals of the coil L–1 is higher than that of the coil L–2 and the core portion of the forward coil is saturated earlier than that of the coil L–2. A pulse $e_3$ shown immediately before the pulses $e_2$ and $e_2'$ is produced by an unbalanced voltage, which voltage is due to that the bridge is not in equilibrium before the saturation of the two core portions, the bridge being balanced after their saturation. This unbalanced voltage $e_3$ can be sufficiently small, as compared with pulses $e_2$ and $e_2'$.

Now, when a magnetic field $H_2$ is added to the toroidal coil assembly of FIGURE 2A, it will be apparent that the pulse $e_1$ shown in FIGURE 3*a* and pulses $e_2$, $e_2'$ and $e_3$ shown in FIGURE 3*b* are superimposed and produced across the terminals X and Y.

The resultant voltage $e_4$ and $e_4'$ can be shown in FIGURE 3*c*. If $H_2$ is further increased, all the pulses which can be shown as $e_5$ and $e_5'$ are in the same direction as shown in FIGURE 3*d*. Accordingly, the upper pulse $e_2$ and lower pulse $e_2'$ are equal in height, when there is no external magnetic field $H_2$. Hence the accuracy of measurement in case of the extremely small external magnetic field can be increased.

Figure 8:
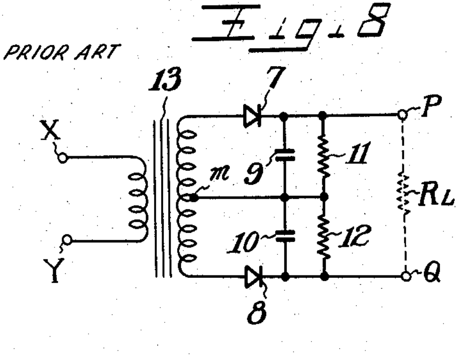
PRIOR ART Fig. 8
FIGURE 8 is a connection diagram of a well-known converter circuit used to be connected to a torodial coil such as shown in FIGURE 1 in which pulse signals are converted into direct current signals.

FIGURE 8 is a connection diagram of a well-known converter circuit which has been used in connection with the toroidal coil assembly as has been explained. That is, the terminals X and Y of the converter circuit are respectively connected to the terminals X and Y of the bridge shown in FIGURE 2.

The converter circuit is provided with a transformer 13 the primary side of which is connected to the terminals X and Y, two diodes 7 and 8 which are connected to the outer terminals of the secondary side of the transformer 13, a parallel circuit consisting of a capacitor 9 and a resistor 11, which is connected across the output end of the diode 7 or a terminal P and the midpoint *m* of the secondary side of the transformer 13, and another parallel circuit consisting of a capacitor 10 and a resistor 12 which is connected to the output end of the diode 8 or a terminal Q and the midpoint *m*. Accordingly pulses, for example, as shown in FIGURE 3*c* are applied to diodes 7 and 8 through a transformer 13. When a pulse induced across the upper part of the secondary side of the transformer 13 is applied in the conductive direction of the diode 7, the diode becomes conductive to pass the pulse to the resistor 11 so that the capacitor 9 is charged by the voltage across the resistor 11, which voltage is in proportion to the height of the pulse across the terminals X and Y. In response to a pulse of the inverse polarity the diode 8 becomes conductive to charge the capacitor 10. Therefore, by selecting respectively the time constants of the capacitor 9 and the resistor 11 and the capacitor 10 and the resistor 12 sufficiently large as compared to the alternating current period, a direct current voltage which is proportional to the difference of the height of the upper and lower pulses in FIGURES 3 *b, c* and *d* can be obtained across the terminals P and Q. That is, when the external field $H_2$ is 0 the voltage across the terminals P and Q is 0, namely the output voltage is proportional to the strength of the external field, and the polarity of the output voltage is inverted, if the direction of the field $H_2$ is reversed.

Thus, the external magnetic field $H_2$ can be detected as a direct current voltage. Furthermore, when external magnetic field $H_0$ which is at a right angle to $H_2$, the core parts corresponding to the coils L–1 and L–2 are saturated simultaneously, so that pulses as shown in FIGURE 3*b* are produced and the height of the positive pulse is equal to that of the negative pulse and the output voltage across the terminals P and Q is 0.

In the presence of only $H_1$ the magnitude of which is equal to that of $H_2$, and if the direction of $H_1$ is between the directions of $H_0$ and $H_2$, the value of the voltage produced across the terminals P and Q due to $H_1$ lies between the voltage values due to $H_0$ and $H_2$.

Accordingly, when a magnetic field is rotated with respect to the toroidal coil, a voltage produced across the terminals P and Q is varied substantially along a sinusoidal form with the rotation angle from the direction of $H_0$. Accordingly the direction of the magnetic field $H_1$ can be detected.

The detector explained above has the following disadvantage. Referring to FIGURE 2, if the core portion of the coil L–1 is saturated earlier than that of the coil L–2 in a half cycle, almost entire voltage of the power source 3 is applied to the coil L–2, so that the saturation of the core portion of the L–2 is accelerated. For this reason, it is inevitable that the width of the pulse becomes narrow.

Figure 4:
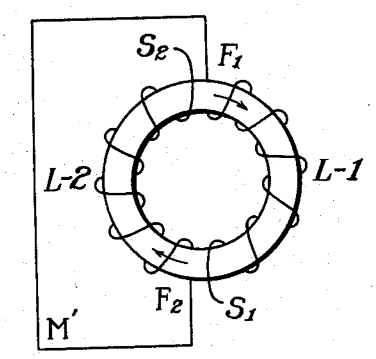
FIGURE 4 is an explanatory diagram of the torodial coil for detecting a magnetic field as a part of this invention.
Figure 5:
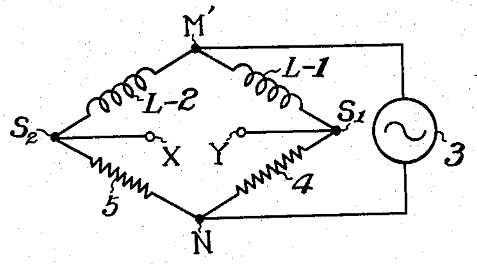
FIGURE 5 is a bridge circuit diagram including the torodial coil shown in FIGURE 4.
Figure 5A:
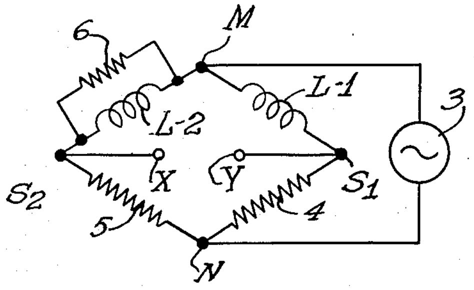
FIGURE 5A is a view similar to FIGURE 5 showing an additional impedance in parallel with one of the windings.

This invention is intended to remove the above disadvantage. FIGURES 4 and 5 and 5A illustrate one example of this invention and constitute one part thereof. It will be noted that FIGURE 5A bears the same relationship to FIGURE 5 as FIGURE 2A bears to FIGURE 2. In FIGURE 4, a winding is divided in two exactly equal portions, one of which is designated by L–1, and $S_1$ is the beginning of one coil and $F_1$ is the end thereof, namely the coil is wound distributionally on the half portion of the ring core 1. The other coil L–2 is also wound on the other half portion, and $S_2$ is the beginning of the coil L–2 and $F_2$ is the end thereof. The coil from $S_1$ to $F_1$ and from $S_2$ to $F_2$ are equal in the sense of turn and in the same polarity. $F_1$ and $F_2$ are connected to each other, designated by M'. The coils L–1, L–2 and two resistors 4, 5 form a bridge circuit in which one pair of opposite diagonals M' and N are connected to an alternating current source 3 in such a manner that the circuit including the coils L–1 and the resistor 4 and the circuit including the coils L–2 and the resistor 5 are connected in parallel with respect to the source 3, the other pair of the opposite diagonals $S_1$ and $S_2$ being connected to the output terminals X and Y.

As in the foregoing example of the well known device, a current from the power source 3 is separated at M' to flow through the coils L–1 and L–2, but the fluxes due to the separated currents circulate through the entire pass of the core. However, even if the core portion of the coil L–1 is saturated earlier than that of the coil L–2, the voltage applied to the coil L–2 does not vary and hence the saturation of the core portion of the coil L–2 is not accelerated. Across the terminals X and Y is connected a converter circuit of FIGURE 8, the impedance of which is not so high. Since the impedance of the converter circuit will be connected in parallel with respect to the power source 3 to the coil L–2 when the coil L–1 is saturated, the current from the power source 3 is separated to flow through the coil L–2 and the converter circuit so that the voltage to be applied to the coil L–2 is rather reduced and the saturation of the core portion of the coil L–2 is delayed. Accordingly, larger pulses are produced even by a small external magnetic field as compared with that in FIGURES 1 and 2 and 2A, accordingly sensitivity of the device according to this invention is high on account of its large output. The output signals of the devices shown in FIGURES 5 and 5A are illustrated in FIGURE 3A, and in comparison to the pulses shown in FIGURE 3 have an appreciably wider base and a substantially increased heighth. Moreover, the converter circuit according to this invention shown in FIG- URE 5 and in FIGURE 5A has another advantage. That is, an appreciably large current is passing through both the coils L–1 and L–2 when the core parts of the coils L–1 and L–2 are saturated simultaneously in the bridge circuit shown in FIGURE 2, whereas in the bridge circuit of FIGURE 5 such an appreciably large current cannot be passing through the coils L–1 and L–2 even if the corresponding core parts are saturated at the same time because of the fact that the resistors 4 and 5 are respectively connected in series with the coils L–1 and L–2 with respect to the source 3. Accordingly the exciting power for the coils can be used economically.

Figure 6:
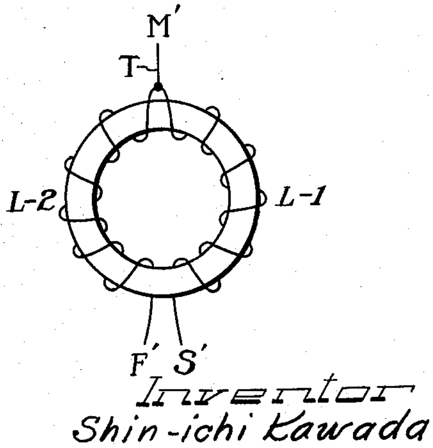
FIGURE 6 is an explanatory diagram of another winding method of a magnetic field detecting torodial coil of this invention.

It will be apparent that the same operation as explained in the foregoing example can be obtained if $S_1$ and $S_2$ are connected to each other, designated by M′, and $F_1$ and $F_2$ are connected to the resistors 4 and 5 in FIGURE 4. Furthermore, the operation of the resistor 6 in FIGURE 5A is similar to its role in FIGURE 2A and the resulting waveforms, shown in FIGURE 3*b*, *c* and *d* are obtained similarly across X and Y. Besides, an inductance which is more difficult to be saturated than the coils L–1 and L–2 or a non-linear element can be used in place of the resistor 6. This detecting device can be made in the manner of the winding shown in FIGURE 6. That is, in FIGURE 6 the sense of turn from M′ to F′ is the same as in the foregoing examples but that from S′ to M′ is opposite thereto. In this case, both the M′ in FIGURES 4 and 6 are exactly equivalent, accordingly even if S′ and F′ in FIGURE 6 are respectively connected to the terminals $S_1$ and $S_2$ in FIGURE 5, instead of using the toroidal coil shown in FIGURE 4, the same detecting device can be formed.

Figure 7:
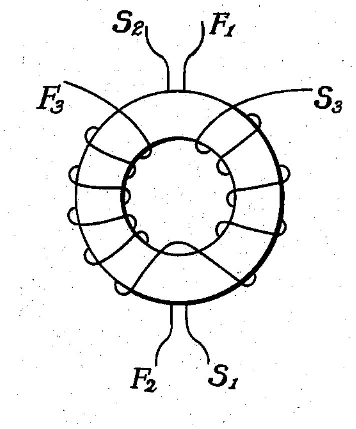
FIGURE 7 is an explanatory diagram of a torodial coil of this invention employed as a minute direct current detecting device.

FIGURE 7 illustrates also an example of this invention, in which a direct current is supplied from the terminals $S_3$ and $F_3$ of a secondary winding wound on the coils of FIGURE 4 instead of external magnetic field and thereby a magnetic field corresponding to $H_{21}$ and $H_{22}$ in FIGURE 1 is produced, and this field can be detected. This can be employed as a minute current-pulse converter.

It will be noted that in FIGURE 7, the coils L–1 and L–2 shown in FIGURE 4 are omitted for the sake of simplicity, although the terminals $S_1$, $S_2$ and $F_1$, $F_2$ only are illustrated.

Figure 9:
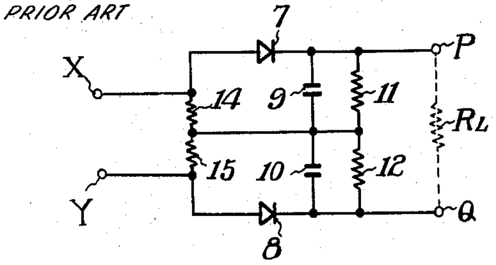
PRIOR ART Fig. 9
FIGURE 9 is also a connection diagram illustrating another example of the above converter circuit.

The detecting circuit in FIGURE 8 has the following disadvantage. That is, since pulses have extremely high frequency component, the pulses are attenuated at a transformer 13 in FIGURE 8. For this reason, even if the turn ratio of the transformer is raised considerably high, a desired output is difficult to obtain from the secondary side. FIGURE 9 shows another converter circuit in which the transformer is excluded. In this case, however, it is inevitably disadvantageous that pulses are shunted to resistors 14 and 15 and that the resistance values of these resistors 14 and 15 cannot be made so high because a current for charging capacitors 9 and 10 is required to flow through either one of the resistors 14 and 15.

Figure 10:
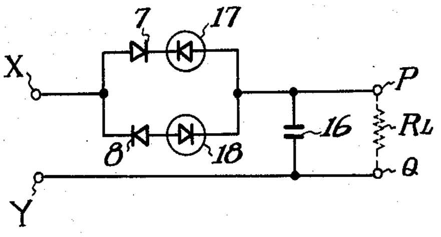
FIGURE 10 is a connection diagram of a converter circuit as another part of this invention.
Figure 11:
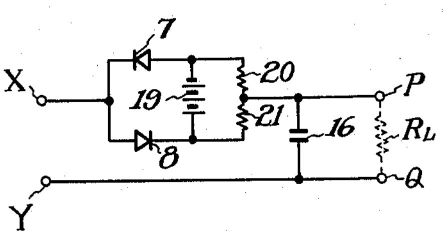
FIGURE 11 is a connection diagram of another converter circuit of this invention.

These disadvantages can be removed by a converter circuit shown in FIGURE 10 which constitutes one part of this invention. Namely, Zener diodes 17 and 18 are newly employed and the Zener diode 17 is connected to a diode 7 in the opposite polarity and in series thereto. The Zener diode 18 is also connected to a diode 8 in the same manner. Accordingly, only the remainder portion that the sum of the Zener voltage and the positive direction voltage drop of the diodes is subtracted from the height of pulses, flows through the diodes 7 and 17 and across a load $R_L$, and it charges a capacitor 16. Also in the pulses in the opposite direction, the portion which exceeds the sum of the positive direction voltage drop of the diode 8 and the Zener voltage of the Zener diode 18 flows across the resistor $R_L$ in the reverse direction to the above and it charges the capacitor 16 inversely. That is, if the time constant formed by the resistor $R_L$ and the capacitor 16 is selected to be sufficiently large as compared with the repeating period of the pulse, a direct current which is proportional to the height of the upper and lower pulses can be obtained across the terminals P and Q. In this case, there does not occur any appreciable attenuation and power loss in the converter of this example as compared with the device shown in FIGURES 8 and 9. Accordingly such a structure as shown in FIGURE 10 is advantageous as compared with those in FIGURES 8 and 9. In this invention, however, not only Zener diodes but also a dead zone element equivalent to a Zener diode can be used in the same manner. FIGURE 11 shows an example in which a dead zone circuit is employed. The dead zone circuit consists of a bridge circuit the two arms of which are respectively two diodes 7 and 8 and the other arms of which are respectively resistors 20 and 21, and the connection point which is connected to the opposite polarity electrodes of the two diodes 7 and 8 and the connection point of the two resistors 20 and 21 form a pair of one diagonal of the bridge circuit and the other pair of diagonal is connected to a unidirectional electric source 19 in such a polarity that the diodes 7 and 8 do not pass a current from the unidirectional source 19. In this case, the voltage of the power source 19 is divided by the resistors 20 and 21 into two equal values and only the higher portion of the pulses which is larger than the sum of the half voltage of the source 19 and the positive direction voltage drop of the diode 7 or 8 is added to $R_L$ and the capacitor 16. That is, the voltage produced at the resistors 20 and 21 will take the same effect as the Zener voltage in FIGURE 10. Therefore, desired objects can sufficiently be attained in FIGURE 11.

Figure 12:
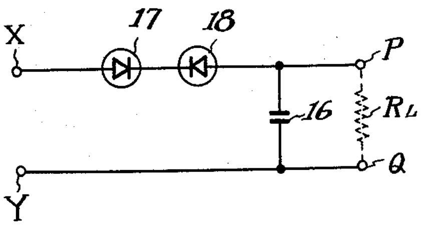
FIGURE 12 is a connection diagram of a still further example of the converter circuit according to this invention.

FIGURE 12 shows another example of the converter circuit in which the terminals X and Y are connected to the parallel circuit of the capacitor 16 and resistor $R_L$ or the terminals P and Q through two Zener diodes 17 and 18 connected in series with the opposite polarity.

By this connection the converter circuit can be simplified but the operation and effect will be the same as already explained in connection with the device shown in FIGURES 10 and 11.

In the converter circuit shown in FIGURES 8 and 9, a direct current output produced across the terminals P and Q should be passing through either one of the resistors 11 and 12. To increase the current output, resistance values of the resistors 11 and 12 must be as small as possible, which makes it impossible to obtain a desired sensitivity. Accordingly the impedance seen from the load resistance $R_L$ can not be made small. In the converter shown in FIGURES 10 to 12, inclusive, on the contrary, there is no impedance except the load $R_L$ to the voltage of the signal pulse beyond the Zener voltage in the converter circuit. Accordingly the converter circuit according to this invention can be of a low impedance type. In the above point of view the converter circuit of this invention can well be adapted as an input network to a transistorized circuit.

It will be apparent that many modifications and variations may be effected without departing from the scope of the novel concept of this invention.

What is claimed is:

1. A magnetic field detecting device comprising:

a toroidal coil assembly having a saturable ring core and a two-coil winding, one of said coils having an impedance connected in parallel therewith, a first of said two coils being wound uniformly on one-half of said saturable ring core, a second of said two coils being wound uniformly on the other half of said saturable ring core, a bridge circuit consisting of said two coils and two other impedances, an alternating current source which is connected to one pair of the diagonal points of said bridge circuit, said one pair of the diagonal points being formed by the connection point of said two coils and the connection point of said two impedances, and a converter circuit including a dead band circuit which becomes conductive only when a plus or minus input voltage beyond a predetermined value is supplied to said converter circuit, the input terminals of said converter circuit being connected to the other pair of the diagonal points of said bridge circuit and a load being connected in series to the output side of said converter circuit.

2. A magnetic field detecting device as described in claim 1, wherein said toroidal coil assembly comprises:

a saturable ring core and two coils each of which is wound uniformly on each half portion of said saturable ring core in the same winding sense, one end of said two coils being connected to an oppositely disposed end of said other coil.

3. A magnetic field detecting device as described in claim 1, wherein said toroidal coil assembly comprises:

a saturable ring core and two coils each of which is wound uniformly on each half portion of said saturable ring core in the opposite winding sense, one pair of the adjacent ends of said two coils being connected to each other.

4. A device for detecting an electric current comprising:

a toroidal coil assembly having a saturable ring core and a two-coil winding, one of which has an impedance connected in parallel thereto, one of said two coils being wound uniformly on one-half of said saturable ring core, the other of said two coils being wound uniformly on the other half of said saturable ring core, a bridge consisting of said two coils and two other impedances, an additional coil disposed on said saturable ring core for having the resulting magnetic field established on one-half portion of said saturable ring core on which one of said two coils is mounted substantially the same in magnitude and opposite in direction as that established on the other half portion of said saturable ring core on which the other of said two coils is mounted, an alternating current source connected to one pair of the diagonal points of said bridge circuit, said one pair of the diagonal points being formed by the connection point of said two coils and the connection point of said two impedances, and a converter circuit including a dead band circuit which becomes conductive only when a plus or minus input voltage beyond a predetermined value is supplied to said converter circuit, the input terminal of said converter circuit being connected to the other pair of the diagonal points of said bridge circuit and a load being connected in series to the output side of said converter circuit.

5. A magnetic field detecting device as described in claim 1, wherein said dead band circuit of said converter circuit includes a parallel circuit comprising:

a series branch of a diode and a Zener diode with opposite polarity and another series branch of another diode and another Zener diode with opposite polarity, said Zener diodes in the respective series branches being connected in the opposite polarity relative to each other, either one end of said parallel circuit being connected to one terminal of the output circuit of said bridge circuit, the other end of said parallel circuit being connected to one end of said load, the other terminal of the output circuit of said bridge circuit being connected to the other end of said load.

6. A magnetic field detecting device as described in claim 1, wherein said dead band circuit of said converter circuit comprises:

a bridge circuit the two arms of which are respectively two diodes connected with opposite polarity and the other arms of which are respectively two resistors, the connection point of said two diodes being connected to one terminal of the output circuit of said first mentioned bridge circuit, the connection point of said two resistors being connected to one end of said load, said connection points forming one pair of the diagonal points of said second mentioned bridge circuit, the other terminal of the output circuit of said first mentioned bridge circuit being connected to the other end of said load, and a unidirectional electric source connected to the other pair of diagonal points of said second mentioned bridge circuit in such a polarity that said diodes do not pass a current from said unidirectional source.

7. A magnetic field detecting device as described in claim 1, wherein said dead band circuit of said converter circuit comprises:

two Zener diodes which are connected in series with each other with opposite polarity, one of the outer terminals of said dead band circuit being connected to one terminal of the output circuit of said bridge circuit, the other outer terminal of said dead band circuit being connected to one end of said load, the other terminal of said output circuit of said bridge circuit being connected to the other end of said load.

8. A magnetic field detecting device comprising:

a bridge circuit having a pair of adjacent series connected inductors and a pair of adjacent series connected resistors, said pair of series connected inductors and said pair of series connected resistors forming a circuit loop, an alternating power source connected from a point intermediate said series connected inductors to a point intermediate said series connected resistors, said power source establishing a flux within a first of said conductors which adds to an external magnetic field being measured and within a second of said conductors which subtracts from an external field being measured, said inductors having a saturable core and said power source having a magnitude for saturating both said inductors under the influence of a magnetic field being measured, a converter circuit connected from a point between a first of said inductors and an adjacent resistor to a point between a second of said inductors and an adjacent resistor, a load impedance connected to the output of said converter circuit, whereby said inductors are saturated at different time intervals causing a current spike across said converter circuit and whereby said current spike is maximized for increasing detection sensitivity of said circuit.

9. A magnetic field detecting device as described in claim 8 wherein said inductors are wound to comprise:

a toroidal coil assembly, said first inductor wound uniformly on one-half of the core and said second inductor wound uniformly in the same winding sense on the other half of the core, an end of said first inductor connected to a diametrically oppositely disposed end of said second inductor and said common connection of said inductors being a point of application of said power source to said bridge circuit.

10. A magnetic field detecting device as described in claim 9 wherein said converter circuit comprises:
first and second circuit legs having a capacitor connected therebetween at the output thereof,
said first circuit leg having first and second parallel branches, each branch having a diode and an oppositely connected Zener diode,
said diode and Zener diode of said first branch being oppositely orientated relative to the corresponding element of said second branch,
whereby oppositely directed voltages applied to said first leg will be passed by said opposite parallel diode above the Zener breakdown voltages of said Zener diode and rectified by said capacitor.

11. A magnetic field detecting device as described in claim 9 wherein said converter circuit comprises:
first and second circuit legs having a capacitor connected therebetween at the output thereof,
said first circuit leg having first and second parallel branches, each branch having a diode and a series resistor, a D.-C. power source connected from said first branch intermediate said associated diode and resistor to said second branch intermediate said associated diode and resistor,
said diode of said first branch being oppositely orientated relative to said diode of said second branch and both said diodes being reverse biased by said D.-C. power source.

12. A magnetic detecting device as described in claim 9 wherein said converter circuit comprises:
first and second circuit legs having a capacitor connected therebetween at the output thereof,
one of said circuit legs having two series connected oppositely orientated Zener diodes,
whereby said capacitor will be charged by negative and positive pulses which exceed the breakdown voltages of said Zener diodes.

References Cited by the Examiner

UNITED STATES PATENTS

| | | | |
|---|---|---|---|
| 2,252,059 | 8/1941 | Barth | 324—43 |
| 2,390,051 | 12/1945 | Barth | 324—43 |